MAGNETIC TAPE MEANS FOR CONTINUOUS RECORDING ALONG A PLURALITY OF TRACKS ON AN ENDLESS TAPE

Filed April 26, 1966 3 Sheets-Sheet 1

INVENTORS
MUNEO ATSUMI
SHIRO OKAMURA
BY
OSTROLENK, FABER, GERB & SOFFEN
ATTORNEYS

INVENTORS
MUNEO ATSUMI
SHIRO OKAMURA
BY
OSTROLENK, FABER, GERB & SOFFEN
ATTORNEYS

INVENTORS
MUNEO ATSUMI
SHIRO OKAMURA
BY
OSTROLENK, FABER, GERB & SOFFEN
ATTORNEYS

United States Patent Office 3,495,047
Patented Feb. 10, 1970

3,495,047
MAGNETIC TAPE MEANS FOR CONTINUOUS RECORDING ALONG A PLURALITY OF TRACKS ON AN ENDLESS TAPE

Muneo Atsumi and Shiro Okamura, Tokyo, Japan, assignors to Nippon Electric Company Limited
Filed Apr. 26, 1966, Ser. No. 545,326
Claims priority, application Japan, Apr. 30, 1965, 40/25,761
Int. Cl. G11b *5/00*
U.S. Cl. 179—100.2 2 Claims

ABSTRACT OF THE DISCLOSURE

A magnetic tape recording and playback assembly having an endless closed-loop belt continuously movable along a first direction by a capstan. Record-playback assemblies are positioned in close proximity to the belt for recording either closed-loop tracks arranged in spaced parallel fashion relative to one another or for recording a continuous helical track from one top edge of the belt to the bottom edge thereby eliminating the need for reversing the belt during operation. In forming the helical track, servo means are provided for moving the recording-playback assembly transverse to the tape movement to form the helical track. In forming individual closed-loop tracks separate head assemblies are provided which are electronically switched as soon as the starting point of each individually closed-loop track is reached. Mechanical means may be provided to offset the plurality of individual recording-playback assemblies during playback to reduce the switching period substantially to zero. As another alternative method, the plurality of individual recording-playback assemblies may each be assigned to a plurality of tracks enabling one of said individual recording-playback assemblies to be moved after scanning one track toward the next track with which it is associated while a remaining one of the individual recording assemblies is scanning its track so as to eliminate the need for stopping the operation during the movement of an individual recording-playback assembly from one track to another.

The instant invention relates to magnetic tape recorders and more particularly to a novel television magnetic recorder capable of simply and reliably recording or playing back electrical signals occupying a high frequency band such as, for example, video signals.

Conventional magnetic tape recorders employed for the purpose of recording and playing back video signals may broadly be classified into two general categories in accordance with their applications, as follows:

Magnetic video tape recorders designed primarily for television and broadcasting or industrial use and recorders primarily designed for domestic or private use.

Recorders of the former category typically employ the so-called rotary transducer system in which a magnetic drum or head wheel provided with a plurality of record/playback heads arranged on the peripheral surface thereof is rotatably driven by a constant-speed motor. Magnetic tape of a suitable width is scanned by these transducers in a direction which is substantially transverse to the direction of tape travel. When the relative speed between the rotating transducers and the linearly moving magnetic tape is increased, recording or playback of television signals at frequencies as high as several megacycles may be performed.

As an alternative to recorders of the former category, recent efforts have been directed to the development of television magnetic tape recorders of the latter category to suit the needs of domestic users. There have been reports of the availability of a few types of home TV magnetic tape recorders which do not differ in any particular manner from ordinary audio magnetic tape recorders in both appearance and mechanical construction.

The former commercial television magnetic tape recorders inevitably involve the use of complex mechanisms and a large variety of electrical circuits in order to assure well-balanced mechanical and electrical performance of the magnetic transducers, extremely accurate rotating speeds of the rotary magnetic drum, and enhanced manufacturing and fabrication precision for each component of the tape transport mechanism or alternatively, necessitates the provision of a tracking servo system. These complex requirements inevitably result in equipment which is bulky, heavy and expensive on the one hand and complex in design, difficult to manufacture, adjust, operate and perform preventative maintenance services.

A few recorder models of the latter category have presently appeared on the commercial market. These models employ a method of recording for tracks on a piece of magnetic tape consisting of a zigzag course of two go-and-return tracks, each about 1 mm. in width, by driving a ¼ inch width magnetic tape at a speed of the order of 10 ft. per second.

Each individual track provides 15 minutes of playing time, hence the total playing time is four times 15 minutes per track, or 60 minutes plus time intervals during which the relative speed of the tape to the magnetic head becomes "zero." This occurs three times in the four-track scanning period. That is, changing from the first track to the second track, changing from the second track to the third track, and changing from the third track to the fourth track. During these intervals no signals can be recorder, nor can any playback signals be derived.

Accordingly, an object of the instant invention is to provide video tape magnetic recorders advantageously, but not exclusively, adapted for home use which are characterized by their simple construction, compact size, ease of handling, and moderate cost, while at the same time completely avoiding the need for track changeovers in the conventional sense.

The instant invention is comprised of recorder means including an endless belt and tape drive means for linearly driving the endless belt by a magnetic record playback station for selectively recording or playing back video tape signals. The tape drive speed is maintained relatively constant. Mechanical drive means are also provided for moving the tape head station transversely to the direction of movement of the endless belt so as to produce or follow a helical path around the belt. Adjustment of the transverse speed of the read/record station relative to the velocity of the endless belt determines the pitch of the helical tracks provided on the belt and hence the number of tracks recorded on the belt. In instances where the endless belt is not interchanged among a variety of video tape recorders there is no necessity to provide tracking means. In instances where it is desirable to record on such a belt in one machine and playback on another machine, tracking means are provided for accurately controlling the velocity of the tape record/playback station so as to reliably track the helical path of signals which have been recorded on the belt.

An alternative embodiment comprises the stationary record/playback station having a plurality of read-record heads for recording and playback of a plurality of parallel aligned circular tracks around the endless belt. Switching means are provided for selectively switching among the read/record heads in order to switch from one track to the other, which alternative embodiment introduces only slight intervals during which signals may not be recorded or played back. By proper location of the switching intervals they may be arranged to occur during blanking periods.

In one such alternative embodiment, a read/record head is provided for each track on the endless belt. The numbers of read/record heads may be reduced by one-half through the provision of rotary drive means for moving a first head in position with the third track during the time in which the second head is recording or playing back the second track. As soon as the first head is in operation in conjunction with the third track, the second head may then be moved in position to record or playback from the fourth track. This enables each movable head to be associated with two different tracks on the endless belt.

Another object of the instant invention is to provide novel video tape recorders having electrical and mechanical means for enabling the record/playback head to record or playback sigals on or from a helical record track provided on a magnetic tape arranged in the form of an endless belt (hereinafter referred to as "an endless tape") so as to provide intermission-free playing time of the order of 30 to 60 minutes.

Still another object of the instant invention is to provide recording means having new and improved recording playback assemblies to assure more faithful recording or playback of video signals than has heretofore been possible.

Another object of the instant invention is to provide novel magnetic video tape recorder means comprising means for driving an endless tape at a constant velocity relative to a record/playback station and means for transversely moving said station at a predetermined rate to develop a plurality of helical tracks around the endless tape.

Another object of the instant invention is to provide novel magnetic video tape recorder means comprising means for driving an endless tape at a constant velocity relative to a record/playback station and means for transversely moving said station at a predetermined rate to develop a plurality of helical tracks around the endless tape and further comprising means for very accurately tracking the helically aligned signals to assure fidelity in both recording and playback.

Still another object of the instant invention is to provide novel magnetic video tape recorder means comprising means for driving an endless magnetic tape at a relatively constant speed by a stationary read/record station having a plurality of read/record heads and means for selectively switching among said heads to select the track from which playback or in which recording is to occur.

These and other objects of the instant invention will become apparent when reading the accompanying description and drawings in which:

FIGURE 2 is a hypothetical model of a magnetic tape arranged in single-term loop form showing the manner in which video signals are recorded thereon in helical fashion as an aid in understanding the concept of a helical recording track which is developed by the embodiments of FIGURES 1 and 3.

Figure 5:
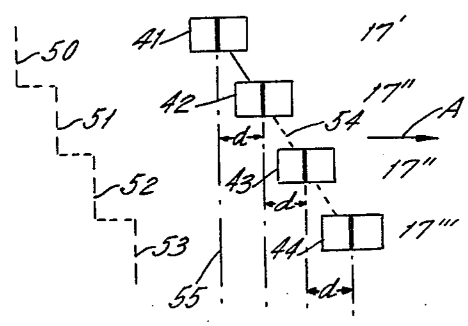
FIGURE 5 is a schematic diagram of another preferred embodiment of a read head assembly.
Figure 5A:
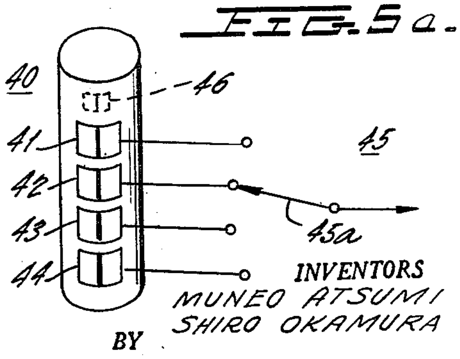
Figure 4:
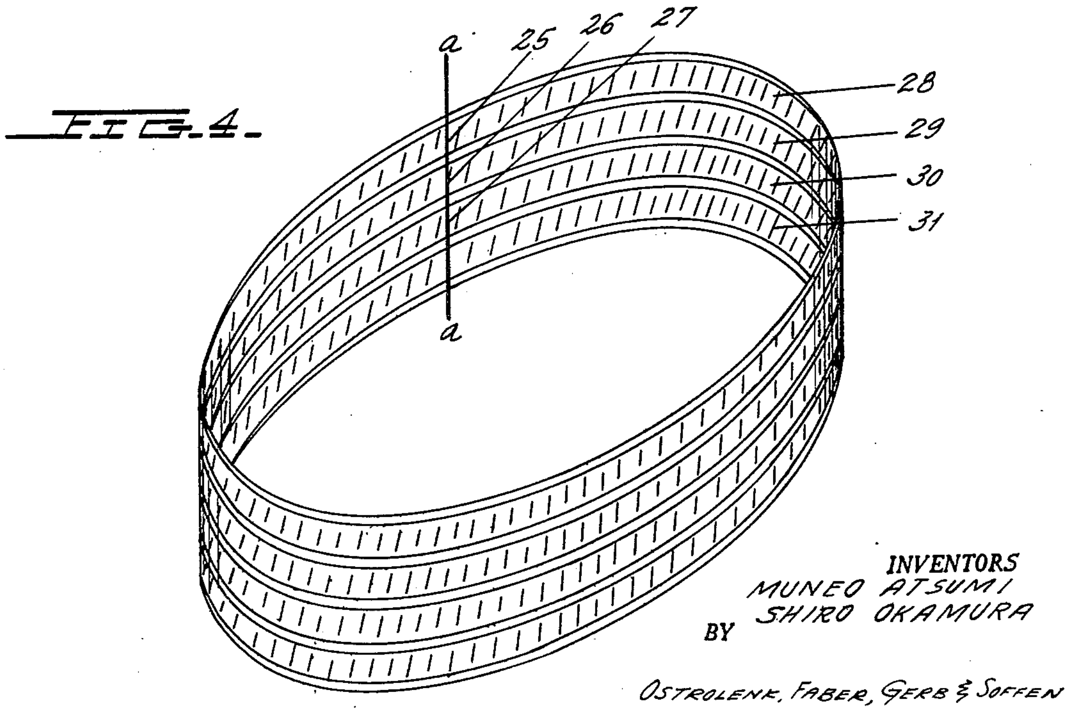
FIGURE 4 is a perspective view of a hypothetical model of magnetic tape shown in single-turn loop form on which several recording tracks are produced when signal intermissions are permitted in the case where the read/record station employs a plurality of selectively operative record/playback heads.
Figure 3:
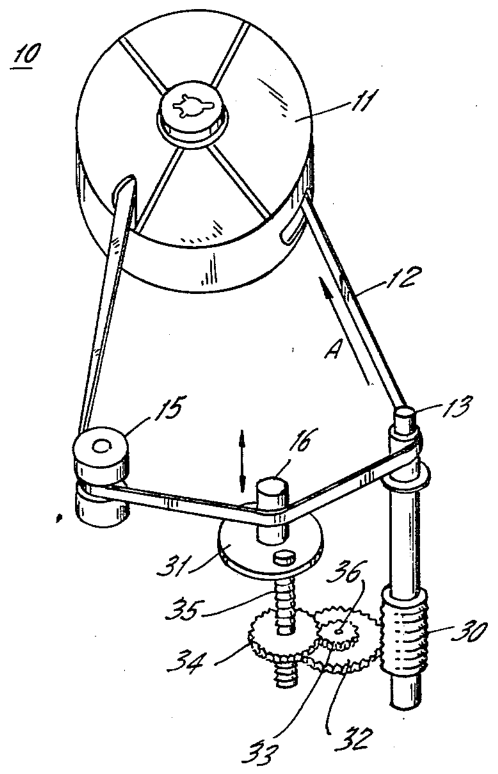

FIGURE 5*a* is a perspective view showing still another embodiment of the instant invention and comprising a plurality of read/record heads and head selection means employed for the purpose of producing the record tracks as shown in the endless tape of FIGURE 4.

Figure 6:
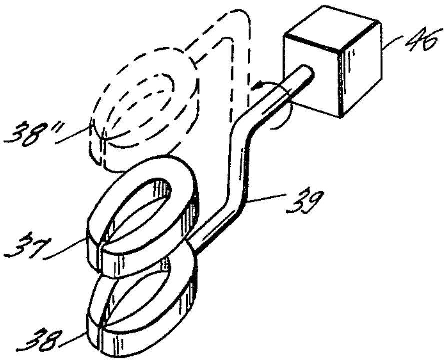

FIGURE 6 is a perspective view showing an alternative embodiment for the plural read/record heads of FIGURE 5.

Figure 7:
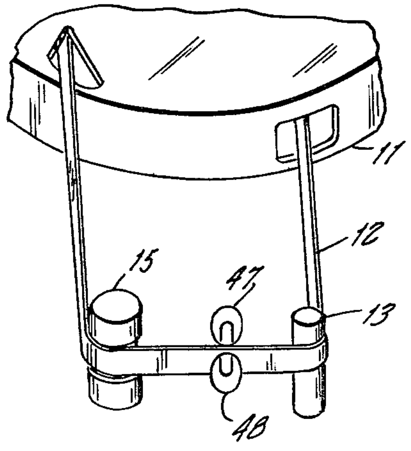

FIGURE 7 is a perspective view showing a tape-transport mechanism and record/playback station for use with an endless belt of the "Möbius strip" form in which opposing surfaces of the tape are utilized for recording.

Figure 1:
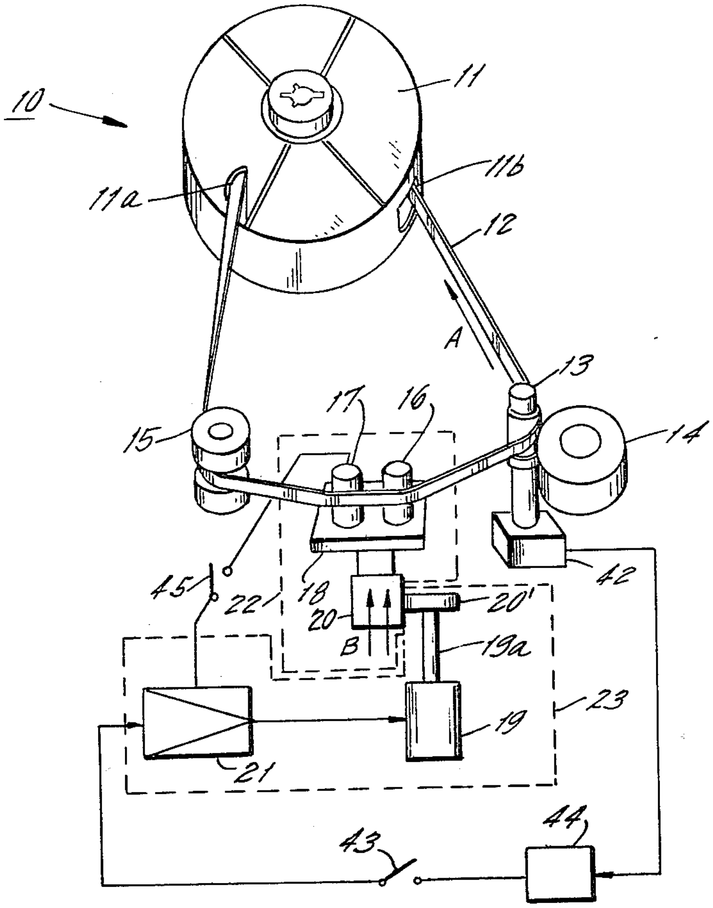
FIGURE 1 is a view partially in perspective and partially in schematic form showing a magnetic video tape recorder characterized by employing the principles of the instant invention.
Figure 8A:
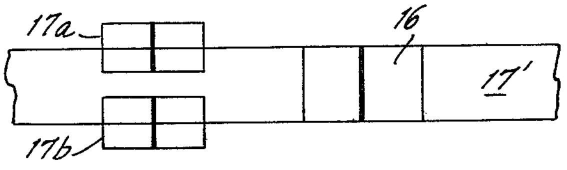
Figure 8B:
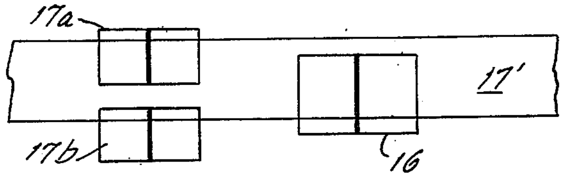
Figure 8C:
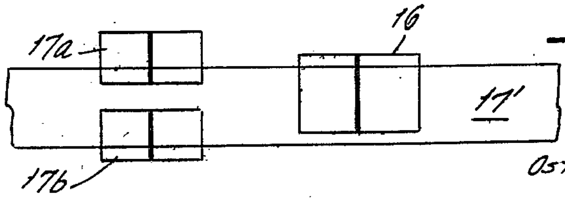

FIGURES 8*a*–8*c* are schematic diagrams useful in describing the tracking means in the embodiment of FIGURE 1.

FIGURE 1 shows a magnetic video tape recorder 10 which embodies the principles of the instant invention. The recorder 10 is comprised of a reel case 11 for encasing the reeled portion of an endless magnetic tape 12, a portion of which tape has been withdrawn from the case for recording of playback purposes. The exposed portion of the tape is positioned around a guide roller 15 which maintains the tape at a predetermined height during its travel, and is further wound about a capstan motor shaft 13 for driving endless tape 12 in the direction indicated by arrow A. The endless tape 12 is frictionally engaged by and positioned between the capstan motor shaft 13 and a pinch roller 14 which cooperates with the shaft to drive the tape in the manner shown.

The operation of the tape-transport mechanism is as follows:

The tape is wound in the conventional sense in the interior of the reel case 11. The innermost layer of the reeled portion of tape emerges from the opening **11*a*, moves past guide roller 15, magnetic head assemblies 17 and 16, capstan motor shaft 13 and pinch roller 14 so as to enter the opening 11*b* provided along the vertical surface of the reel case 11 so as to become the outermost tape layer within the reel case. The tape acquires a predetermined constant speed by being interposed between the capstan motor shaft 13 and pinch roller 14** which exerts a prescribed amount of pressure thereon in the same manner as in ordinary audio magnetic tape recorders.

The magnetic head assembly which is contained within the dotted box 22 is comprised of a record/playback head 16, a pair of sub-heads used exclusively in playback operation, a base plate 18 upon which the magnetic head assemblies 16 and 17 are mounted, a servo motor 19 and a coupling mechanism 20. The magnetic head assemblies 16 and 17, mounting base plate 18 and coupling mechanism 20 are so fabricated during the manufacturing process as to become one unit, thereby leading to the designation of magnetic head assemblies 22.

A servo mechanism assembly 23 employed to operate the magnetic head assembly 22, is comprised of a cooperating coupling mechanism **19*a*, a combined servo motor and speed reducing mechanism 19 and a control circuit 21 for producing signals derived from the playback sub-head assembly 17 to control servo motor 19. The servo mechanism assembly 23 may likewise be fabricated as a single unit wherein the coupling mechanism 20′ and the servo motor and speed reducing mechanism 19** are rigidly installed in a prescribed location of the recorder.

The magnetic head assembly 22 and the servo mechanism assembly 23 are coupled through shaft **19*a* to the mechanisms 20 and 20′, respectively, which may, for example, include suitable gear means. The coupling means is designed so as to enable the direction of rotation of the servo motor 19 to be converted into upward and downward vertical movement, respectively, of the platform 18 and hence the head assemblies 16 and 17**.

The overall operation of the recorder assembly 10 is as follows:

During the recording mode, the capstan motor shaft 13 is rotated at a constant velocity by suitable motor means (not shown). A tachometer 42 coupled to the capstan motor shaft develops output voltage signals representative of the r.p.m. of shaft 13. These signals are impressed upon an analog circuit 44 which develops an analog voltage representative of the shaft r.p.m. If the switch means 43 is closed, the output analog voltage of analog device 44 is applied to the input of servo amplifier 21. In the recording mode switch 43 is closed to enable the analog voltage signals to be amplified by servo amplifier 21. However, the playback sub-heads in sub-head assembly 17 are coupled to another input of servo amplifier 21 through switch means 45. This switch means, however, is kept open during the record mode.

As the endless tape is being driven by the capstan motor shaft, the analog voltage amplified by servo amplifier 21 is employed to drive the servo motor 19, causing its output shaft 19*a* to rotate. The rotation of the servo output shaft 19*a* is reduced by suitable speed reducing means forming an integral part of the servo motor 19. Shaft 19*a* drives coupling mechanism 20' which, in turn, drives coupling mechanism 20 to cause the platform 18 to move in a downward vertical direction so as to form the helical tracks on the endless tape in the manner shown in FIGURE 2. Whereas a tachometer has been described herein as the means for protecting the r.p.m. of the capstan motor, it should be understood that other suitable means may be employed. One such suitable means may be comprised of a pilot read head capable of detecting pilot signals provided along one edge of the tape which may be of the binary type. These pilot signals may be accumulated in suitable counter means, the output of which can be converted into analog form to drive servo amplifier 21 and hence servo motor. Thus, simultaneously with the movement of endless tape 12 the platform 18 and hence the record head assembly 16 is driven vertically downward and transverse to the direction of movement of the endless tape.

For ease of understanding the principles of operation of the magnetic video tape recorder of the instant invention, the following symbols and dimensions will be employed in the pursuant description:

| | |
|---|---|
| Endless tape width | W(m.) |
| Endless tape length | L(m.) |
| Tape speed in horizontal direction | V(m./sec.) |
| Recording track pitch | P(M) |

As was previously mentioned, the magnetic head assembly 22 is designed to descend continuously at an arbitrary speed with respect to the endless tape 12 which is driven in the horizontal direction at a velocity V (m./sec.).

This arrangement causes a helical shaped track as shown in FIGURE 2 to be recorded on the magnetically coated surface of the endless tape 12 so long as the tape drive and head drive velocities are suitably selected.

Referring to FIGURE 2, there is shown therein a hypothetical model of an endless tape 14 which is illustrated in its simplest form of a single loop for ease of understanding the principles of the instant invention. The starting point of the recording tracks is located at position 15 and the termination point of the recording tracks is located at position 16. One typical recording track is designated by the numeral 17', which track is located between the starting and ending points 15 and 16.

The elapsed time required for one revolution of the endless tape, i.e., from start position 15 to position 16', for a tape moving at a velocity V (m./sec.) may be expressed as $$t=\frac{L(m.)}{V(m./\text{sec.})}\ (\text{sec.})$$

L=peripheral length of the endless tape in meters.

In accordance with the hypothetical endless tape 14 of FIGURE 2, recording can be performed continuously on four circumferential track sections 15–16', 15'–16'', 15''–16''', and 15'''–16. The total playing time therefore is given by $$4\times t(\text{sec}) \qquad (1)$$

In recording the helical tracks on to endless tape 14 care must be taken so as not to record in the triangular sections 18 or 19 each of which share the upper and lower tape edges respectively, as one side of the triangle. Either of these triangular shaped sections maintain normal track width and therefore one circumferential zone produced by the sum of the areas 18 and 19 cannot be utilized for recording purposes.

Let it be assumed that the endless tape width is to be divided into N tracks of equal width. A track pitch must thereby be selected having a small inclination angle given by $$\alpha=\tan^{-1}\frac{P(m.)}{L(m.)}$$

which angle is measured with respect to the tape edge for each record track. Having selected the track pitch the number of record tracks capable of one perfect revolution along the endless tape wherein full track width is maintained will be equal to $N-1$ at all times. Therefore, the total playing time (T) may generally be expressed as $$T+(N-1)\times t(\text{sec}) \qquad (2)$$

The magnetic head assembly 22 must therefore be moved downwardly at a constant speed S which is given by the expression $$S=\frac{P(m.)}{t}\ (m./\text{sec.})$$

Thus, the absolute displacement distance M(m.) of the magnetic head assembly 22 in the direction perpendicular to tape travel which is necessary to track one complete revolution for all tracks from initiation point 15 to termination point 16 is given by the expression $$M=P\times(N-1)(\text{m.})$$

It is thereby possible to develop a track of video signals as illustrated in FIGURE 2 upon the endless tape magnetic surface with the only necessity being that the tracks be properly retraced during the playback operation.

Both the capstan slip and the deviation from proper tracking due to elongation or contraction of the endless tape are of a degree that can be substantially disregarded when recording and playback are performed with the same recording assembly. Therefore installation of a servo system can be dispensed with in most cases. In playback from endless tapes varying slightly in both length and the inclination tracking angle—that is, when tape interchangeability is taken into consideration, installation of a tracking servo system is important.

FIGURES 8*a*–8*c* are schematic diagrams illustrating the basic principles of a tracking system applicable to the instant invention. In FIGURES 8*a*–8*c*, 17' designates a record track moving in the direction shown by arrow A wherein the playback is achieved by means of the record/playback head 16 and wherein tracking adjustments are controlled by the tracking sub-heads 17*a* and 17*b* (hereinafter referred to as subheads).

The prime object of the tracking system is to achieve proper tracking or retracting by use of the sub-heads 17*a* and 17*b* and a signal picked up from each of these subheads when playback takes place by record/playback head 16.

As illustrated in FIGURES 8*a*–8*c* the sub-heads 17*a* and 17*b* are disposed in the forward direction relative to record/playback head 16 when considering the direction of movement of track 17. Thus, any signals at any point in track 17 will be sensed by sub-heads **17*a* and 17*b* prior to being sensed by record/playback head 16. The sub-heads are designed to overlap track 17 by equal amounts when the track is properly retraced by the record/play-back head 16**.

The two sub-heads should preferably have substantially the same electrical and mechanical performance characteristics, although this is by no means an indispensable requirement.

FIGURE 8*a* represents proper tracking. It can be seen that equal portions of the sub-heads 17 and **17*b* are positioned above the track and that the record/playback head 16** is positioned in perfect alignment over the track. FIGURES 8*b* and 8*c* represent instances of mistracking. FIGURE 8*b* shows one arrangement in which the pickup of a signal from sub-head **17*a* will be stronger relative to the signal picked up from sub-head 17*b***. FIGURE 8*c* shows an arrangement wherein the pickup of a signal from sub-head **17*b* will be predominantly greater than that from sub-head 17*a*. It is thereby evident that when the signal outputs from the sub-heads 17*a* and 17*b*** are equal in magnitude perfect tracking results as is shown in FIGURE 8*a*. The signals are applied to the servo amplifier 21 of FIGURE 1 so that when sub-head **17*a* develops the predominantly larger signal a reduction in the velocity of descent will occur. When sub-head 17*b*** generates the predominantly larger signal, an increase in the velocity of descent will occur.

Generally speaking, it is desirable that a sub-head not be enabled to pickup a signal from an adjacent track under the dimensional conditions in which the record track width is of the order of two to three times the distance between tracks and further, one-half of each sub-head be overlapped with the record track width under the ideal tracking state in the manner as illustrated in FIGURE 8*a* from the viewpoint of ease of control of tracking. The effective width of each sub-head is preferably a little less than twice the distance between adjacent tracks. An ideal tracking system can be accomplished in such a tracking servo mode by adjusting the relative positions of the record/playback head 16, the two sub-heads **17*a* and 17*b* and the record track 17′** so that the signal outputs from the sub-heads will be of equal magnitude.

More particularly stated, the most appropriate method for detecting mistracking is to provide an error signal representing the difference between the two signals derived from the sub-heads in order to operate the servo loop circuit for controlling the rotational speed of servo motor 19 or the speed of displacement of the magnetic head assembly 22 by way of the servo motor amplifier 21 which, in turn, is operated by the detected error signal.

Figure 3:
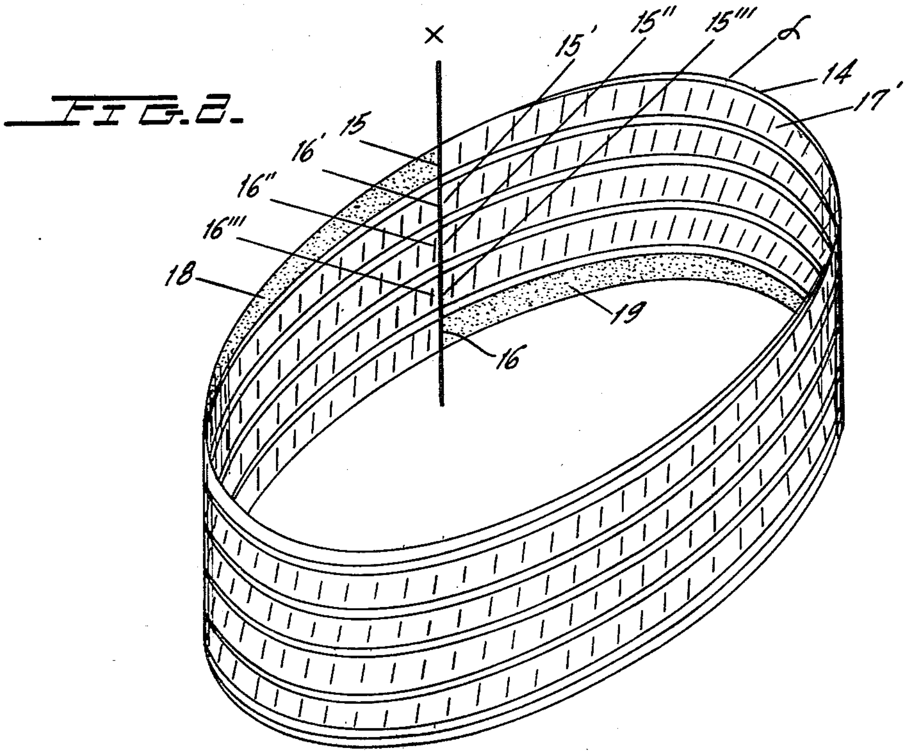
FIGURE 3 is a perspective view showing an alternative embodiment of the recording means of the instant invention.

Although a particular tracking servo system has been described hereinabove in connection with one embodiment of the instant invention, any other suitable method can be applied with equal success in order to drive the endless tape, so long as the method employs a mechanism capable of causing the head assembly to be displaced downwardly with the movement of the endless tape. For example, the head assembly may be displaced by the upward or downward movement of head platform 31 shown in FIGURE 3 by way of a series of speed reducing means such as the wormgears 30 and 35 which are operatively connected by the gear members 32, 34, respectively. Wormgear 30 is driven in synchronism with the capstan motor shaft 13, rotatably driving gear 32. Gear 33 is rigidly coupled to the same shaft 36 as gear 32 and rotates in synchronism therewith for the purpose of driving gear 34. Gear 34 is rigidly coupled to the same shaft including wormgear 35, driving wormgear 35 in synchronism with gear 34. The rotation of wormgear 35 imparts upward or downward vertical movement to head platform 31 which threadedly engages the wormgear. A helical record track as illustrated in FIGURE 2 can be produced according to this method, but mis-tracking due to the deviation in the height of the tape relative to platform 31 or due to elongation or contraction of the tape may be substantially disregarded insofar as recording or playback is performed with the same recorder. This type of mistracking can be eliminated by adjustment of the record/playback head assembly 16 with respect to the head platform 31. However, the advantage of the tracking servo system illustrated in FIGURE 1 which is capable of automatic tracking after installation of any endless tape can scarcely be overlooked. The mistracking may be compensated by combining the driving means shown in FIGURE 3 with the servo system of FIGURE 1.

An alternative arrangement which may be employed in the instant invention is shown in FIGURE 5*a*. An alternative tape head assembly 40 is comprised of a plurality of record play-back heads 41–44 which are selectively electrically coupled to the recording or playback electronics (not shown) by means of switch arm **45*a* of a switch means 45**. In this embodiment slight intermissions must be permitted for switching of the head operation. Using the arrangement of FIGURE 5, recording of signals occurs in the following manner:

FIGURE 4 shows a hypothetical model of an endless tape which may be employed with the record/playback arrangement of FIGURE 5*a*. Considering line *a—a* as the starting point, record/playback head 41 is coupled through switch arm **45*a* to the record electronics causing video signals to be recorded in track 28** shown in FIGURE 4. As soon as a complete revolution of the endless belt has occurred, i.e., as soon as the head returns to the position of the line *a—a*, switch arm **45*a* is moved out of electrical engagement with head 41 and into electrical engagement with head 42. Thus, video signals are recorded in the next track 29 in a similar manner. Switching continues in this manner until four tracks 28–31** are recorded on the magnetic surface of the endless belt. It should be understood as many tracks may be recorded as is desirable, depending only upon the width of each track relative to the width of the endless belt and upon the total number of magnetic heads provided.

Various methods may be employed to control the transfer from one head to the other. For example, a transfer signal may be recorded near the edge of the tape an in alignment with the line *a—a*, which signal may be detected by a separate transfer head 46, for example. Another method which may be employed is to detect the splicing on the tape and transfer from one track to another when the splicing signal is detected. Still another method which may be employed is to produce transfer pulses by an electro-optical means by removing the magnetic coating from a particular position of the tape or by providing a small opening or slit at the starting point of the tape. Whereas the servo motor mechanism or solenoid mechanism may be substituted for the arrangement employing a plurality of heads for the displacement of a magnetic head assembly for record or playback, this method is more or less time consuming when compared with previous methods. The reproduced picture is substantially unaffected insofar as the time required for the displacement is within the order of the vertical blanking time interval.

Since one or more field time intervals are normally required for the displacement, production of the blanking signal simultaneously with the displacement of the head assembly is preferable to the case where the picture would temporarily vanish.

In order to substantially reduce the transfer time of the switching operation to the order of the blanking time interval, an electronic method may be employed for switching between heads. For example, suitable electronic counter means may be employed, which is preferably comprised of a plurality of flip-flop stages for controlling logic gates so that the output of the counter at any given instant controls the logical gates to couple only one head at any given time to the recording or playback electronics. The use of such an electronic switching system will permit transfer between heads to be accomplished within the period normally required for a horizontal blanking interval. While the embodiment of FIGURE 5 employs four record/playback heads, it is possible to reduce the number of heads required by a considerable amount by providing means for gradually moving one of the heads toward the position of the next track to be recorded while the other of the heads is in operation.

FIGURE 6 shows one arrangement which may be employed for accomplishing this objective. The arrangement of FIGURE 6 is comprised of a pair of record/playback heads 37 and 38. Head 38 is shown as being coupled to a crank arm 39 which is rotatable by any suitable motor means 47. When the uppermost track is to be used for recording or playback signals the crank arm 39 is rotated to move the head to the position 38''. As soon as the recording or playback of signals in this track has been completed, electronic or electromechanical means are employed for the purpose of switching the record or playback electronics from head 38'' to head 37. As soon as this switching occurs, head 38' is now in the unused stage. This condition may be employed to trigger operation of motor means 46 to rotate crank arm 39 and hence head 38'' to the solid line position 38 in readiness for recording or playback of the third track from the top. A similar mechanism may be provided for record/playback head 37, thereby doubling the number of tracks with which the heads 37 and 38 are associated.

Another arrangement for measurably reducing the switching interval is shown in FIGURE 5. As shown therein the playback heads are offset by a distance "*d*" relative to one another. Let it be assumed that the tape speed is ten feet/sec. and that switching time between heads is one millisecond. This means that the tape will move approximately 0.12 inch during the switching period. Assuming the direction of tape track movement as given by arrow A, by offsetting head 42 by 0.12 inch to the right of head 41, the switching period can be substantially reduced to zero. The same operation occurs in switching between heads 42–43 and 43–44.

Recording may take place in the normal manner with all heads 41–44 substantially in vertical alignment. The switching operation performed during recording will slightly offset the starting locations of the tracks 17'–17'''' as shown by the dotted lines 50–53, respectively. Thus each distance *d* should be the sum of the displacement between starting points due to the switching time during the recording operation plus the displacement occurring due to the switching time during playback operation. In the above example $d=0.24$ inch.

It should be understood, however, that the required displacement is dependent upon the tape speed and switching time.

As shown in FIGURE 5 the heads 41–44 may be mechanically coupled as shown by dotted line 54 to move the heads into the vertically aligned position 55 for recording and to the position 54 for playback. Alternatively, three additional record heads (associated with heads 42–44 respectively) may be provided in vertical alignment with head 41, which head may function as both a record and playback head.

The available recording surface may be doubled through still another method. The endless tape may be of the "Möbius strip" form in that it is coated with a magnetic material on opposing surfaces as is shown in the embodiment of FIGURE 7. The recording or playback of such a "Möbius strip" is effected through the employment of separate record/playback heads 47 and 48 disposed along opposite sides of tape 12. In order to reduce the mutual interference between two engaging magnetized surfaces (when wound about the reel) to a minimum amount, it is preferred that the directions of magnetization of record tracks on the confronting surfaces of any two adjacent layers be preferably aligned orthogonal to one another. One method for achieving this objective is to tilt either or both of the heads 47 or 48 at an azimuthal angle of from several to 45 degrees with respect to the direction of tape travel.

It can be seen from the foregoing that the instant invention provides a novel recording assembly for magnetically recording video signals upon an endless tape so as to provide either continuous or substantially continuous recording or playback time without the necessity for performing any stopping or restarting operations of the tape during either recording or playback.

While the principles of the instant invention have been described hereinabove in connection with the specific embodiments thereof, it will be clearly understood that further modifications are possible without substantially departing from the spirit of this invention and that the invention be limited only by the claims appended hereto.

For example, a tape spool device of well known construction such as those employed in electronic computer systems may be substituted for the mechanism for driving an endless tape or an electrostatic or optical system or any other suitable system may be substituted for the magnetic recording system for the purpose of recording and/or playback.

What is claimed is:

1. A recorder comprising an endless closed-loop belt with a plurality of tracks recorded thereon;

first means for continuously moving said endless belt in a first direction which is aligned in the direction of its length;

second means comprised of a plurality of individual magnetic head assemblies equal in number to the tracks on said belt, each being arranged to read signals in at least one separate track along said endless belt;

each of said tracks being completely closed loops arranged at spaced intervals from one another with the beginning of each track lying along a line which is substantially perpendicular to the direction of movement of said belt;

control indicia being provided along said tape to mark the beginning of each of said tracks;

means responsive to said control indicia for enabling said individual magnetic head assemblies in a sequential manner to successively read out signals recorded in their associated tracks;

said magnetic head assemblies being arranged in an offset manner and lying along a line which is diagonally aligned relative to the direction of movement of said belt for reducing the switching time between tracks substantially to zero.

2. A recorder comprising an endless closed-loop belt;

first means for continuously moving said endless belt in a first direction which is aligned in a direction of its length;

a recording station positioned in close proximity to the path of movement of said endless belt;

said recording station including second means for recording signals in a plurality of tracks along one surface of said belt;

said second means being comprised of a plurality of individual recording assemblies each being capable of both recording and playback and each being arranged to record signals in at least one separate track along said belt;

each of said tracks being completely closed-loops arranged at spaced intervals from one another;

at least one of said recording assemblies including means movable to a first position for aligning said one recording assembly with an upper level track and movable to a second position to align said one recording assembly with a lower track wherein at least one of the remaining individual recording assemblies is associated with and either recording or playing back an intermediate level track arranged between the above-mentioned upper and lower tracks to enable scanning of said intermediate track while the one of said individual recording assemblies is being moved between said upper and lower tracks.

References Cited

UNITED STATES PATENTS

| | | | |
|---|---|---|---|
| 2,496,047 | 1/1950 | Goddard | 179—100.2 |
| 2,670,212 | 2/1954 | Heller et al. | 179—100.2 |
| 2,809,238 | 10/1957 | Fay | 179—100.2 |
| 3,149,207 | 9/1964 | Maxey | 179—100.2 |
| 3,332,085 | 7/1967 | Gray | 179—100.2 |

BERNARD KONICK, Primary Examiner

J. R. GOUDEAU, Assistant Examiner

U.S. Cl. X.R.

340—174.1